United States Patent
Bäbler

(10) Patent No.: US 6,989,056 B2
(45) Date of Patent: Jan. 24, 2006

(54) IR REFLECTIVE PIGMENT COMPOSITIONS

(75) Inventor: Fridolin Bäbler, Teresópolis (BR)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 38 days.

(21) Appl. No.: 10/945,515

(22) Filed: Sep. 20, 2004

(65) Prior Publication Data
US 2005/0070640 A1 Mar. 31, 2005

Related U.S. Application Data

(60) Provisional application No. 60/506,282, filed on Sep. 26, 2003.

(51) Int. Cl.
C09B 67/22 (2006.01)
C09B 67/20 (2006.01)

(52) U.S. Cl. ............... 106/413; 106/31.75; 106/31.76; 106/31.77; 106/31.78; 106/410; 106/411; 106/412; 47/57.6; 162/162; 252/8.57; 252/587; 424/69; 508/251; 524/88

(58) Field of Classification Search ............... 106/410, 106/411, 412, 413, 31.75, 31.76, 31.77, 31.78; 47/57.6; 162/162; 252/8.57, 587; 424/69; 427/384; 508/251; 524/88
See application file for complete search history.

(56) References Cited

U.S. PATENT DOCUMENTS 4,436,852 A 3/1984 Bäbler ........................ 524/88
4,555,463 A 11/1985 Hor et al. ..................... 430/59
5,472,494 A 12/1995 Hetzenegger et al. ........ 106/493
5,540,998 A 7/1996 Yamada et al. .......... 428/411.1

FOREIGN PATENT DOCUMENTS

CA 1160402 1/1984
WO 03/080742 10/2003

OTHER PUBLICATIONS

Derwent Abstract for DD 296298, Nov. 1991.
Chemical Abstract AN 1993:541282 for DD 301159, Oct. 1992.
Chemical Abstract AN 1976:422766 for DE 2451780, Feb. 1976.
Chemical Abstract AN 1981:158047 for EP 23318, Feb. 1981.
Derwent Abstract 2002-287213 [33] for JP 2002003741, Jan. 2002.
Derwent Abstract 1993-081312 [10] for JP 05027481, Feb. 1993.

Primary Examiner—Anthony J. Green
(74) Attorney, Agent, or Firm—Shiela A. Loggins

(57) ABSTRACT

The present invention relates to IR reflective black pigment compositions comprising a halogenated copper phthalocyanine such as C.I. Pigment Green 7 and a perylenetetracarboxylic acid diimide such as C.I. Pigment Violet 29. The compositions are characterized by an IR reflection spectrum with a positive slope in the wavelength range between 800 and 900 nm when incorporated as coloring agents in coatings or plastics. The inventive IR reflective black pigment compositions are useful for coloring high molecular weight materials like coatings, inks and plastics.

26 Claims, 6 Drawing Sheets

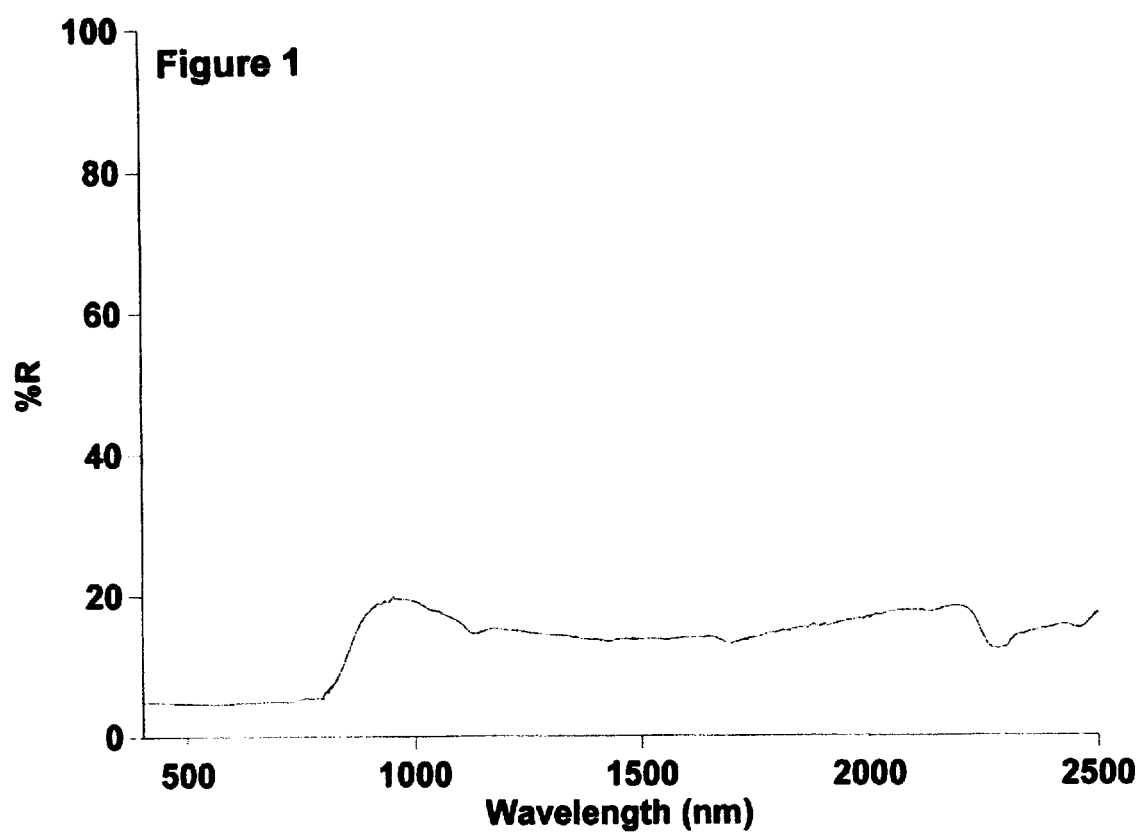

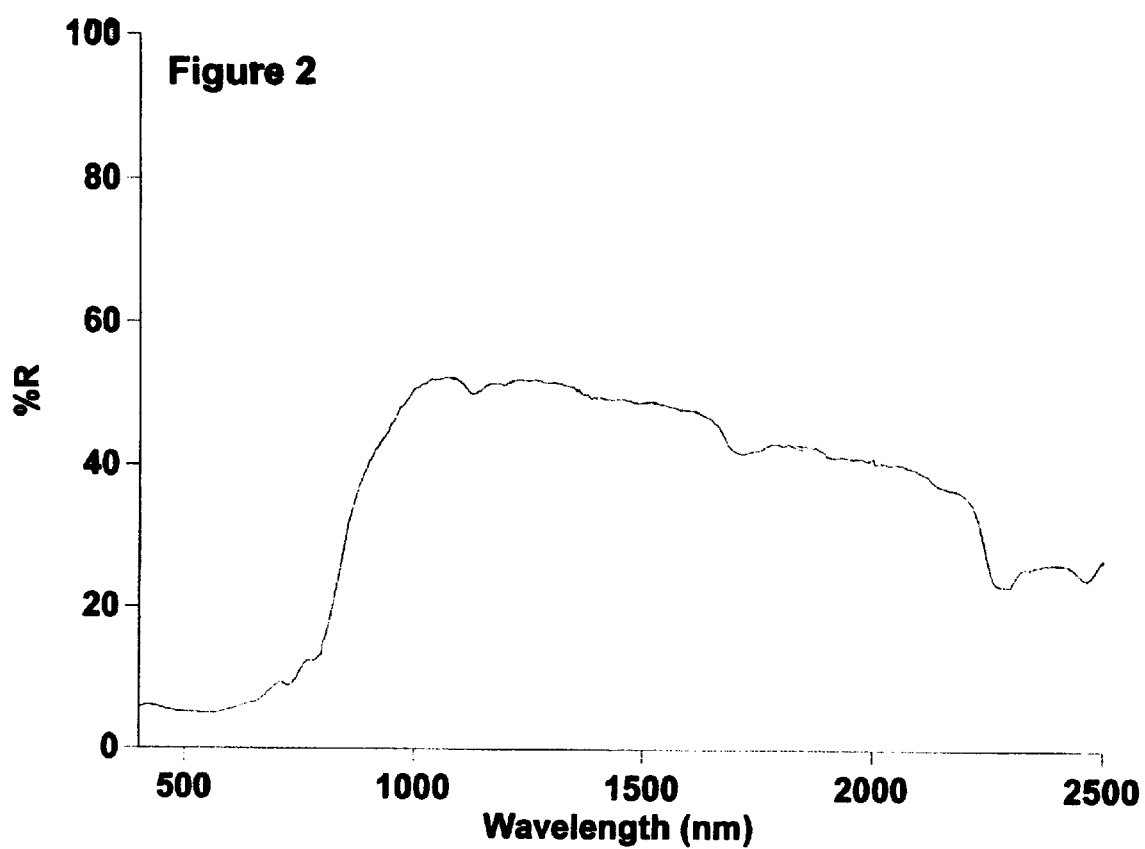

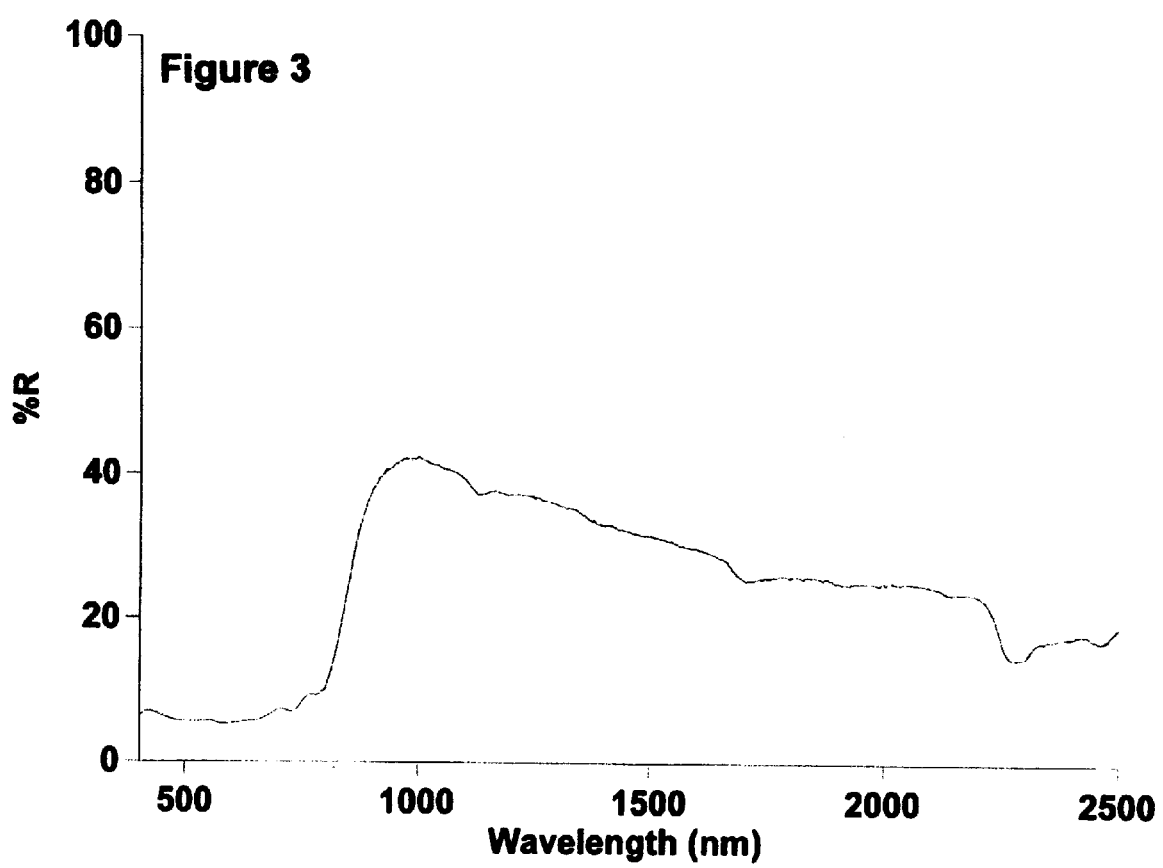

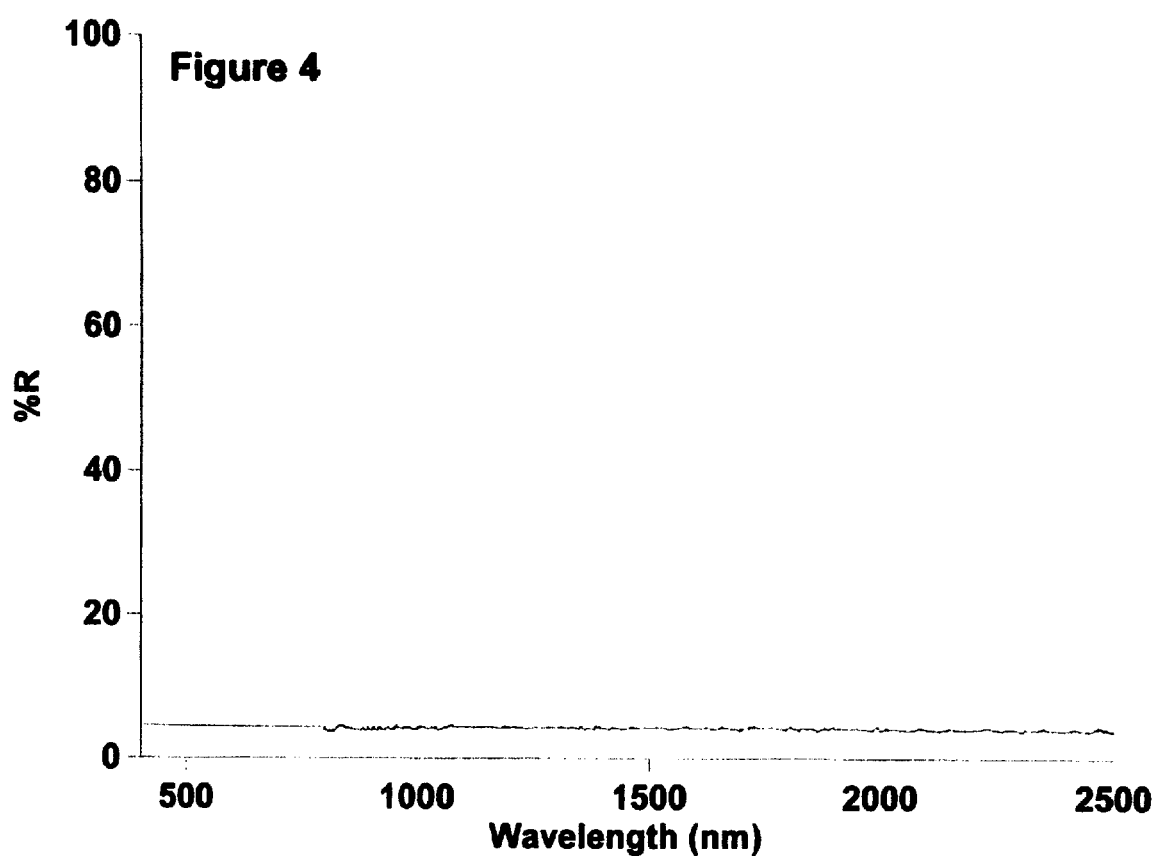

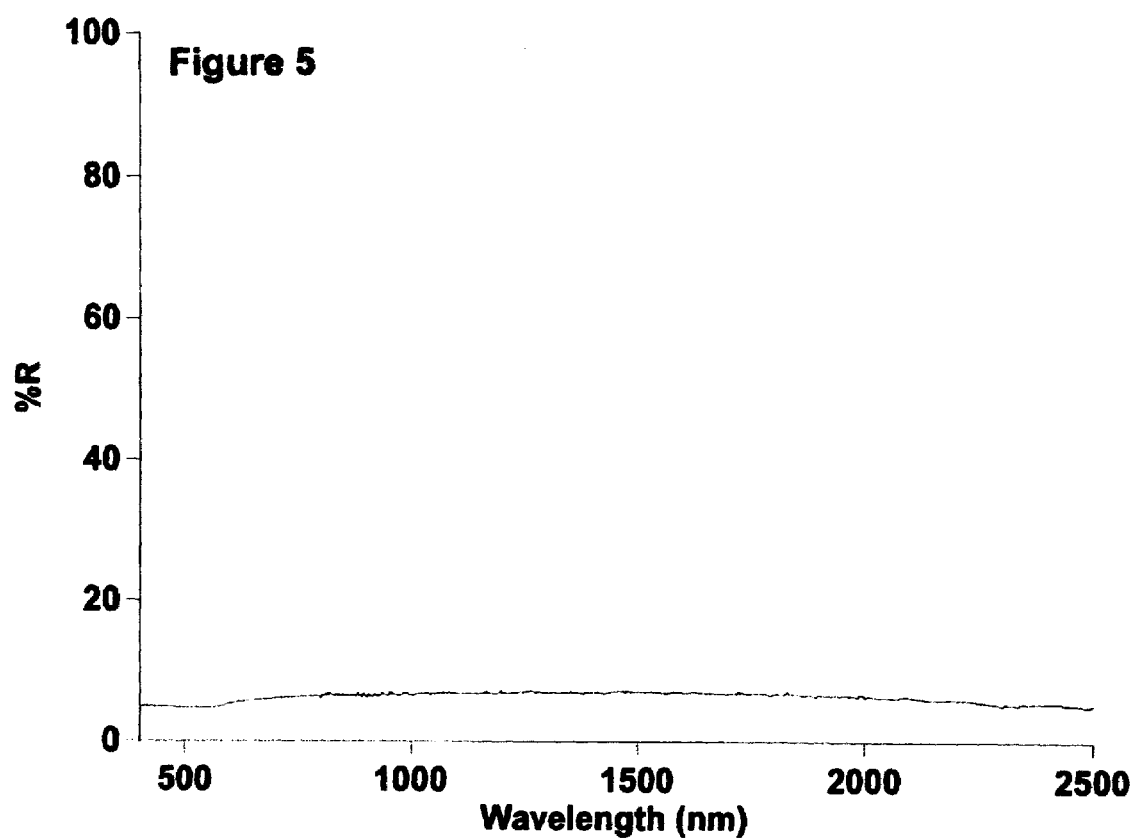

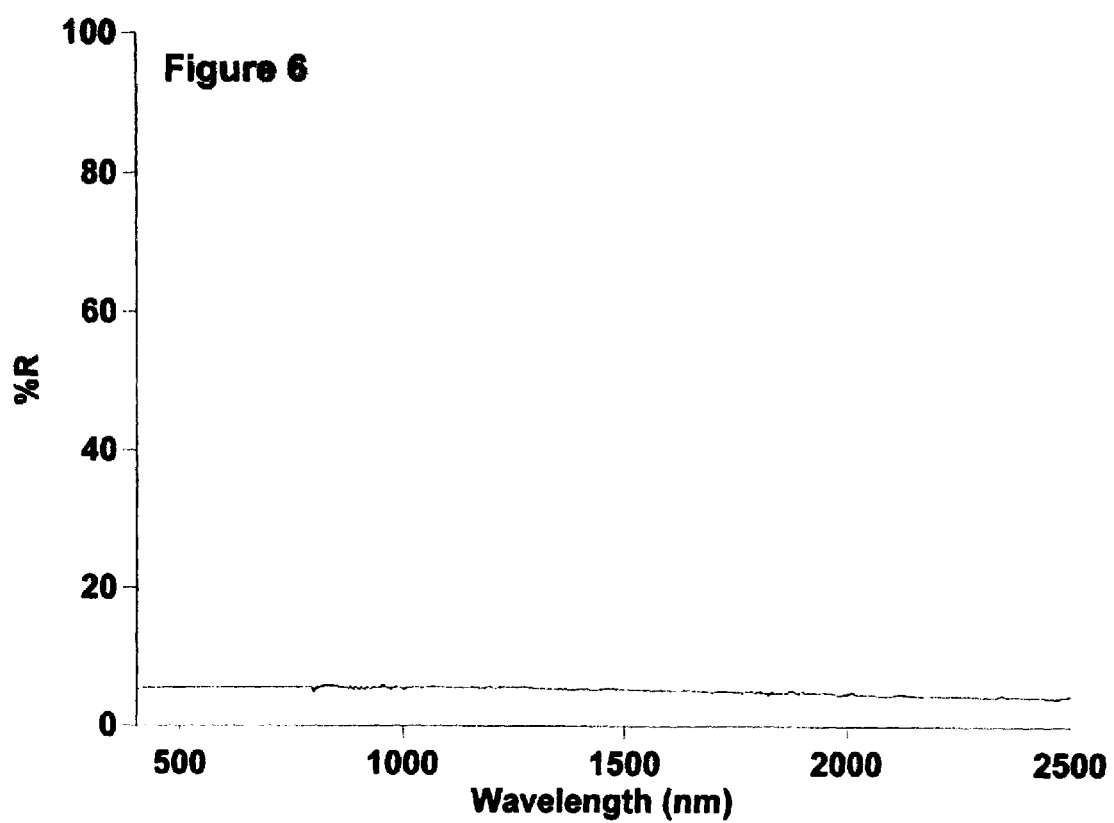

IR REFLECTIVE PIGMENT COMPOSITIONS

This application claims the benefit of U.S. Provisional Application No. 60/506,282, filed Sep. 26, 2003

SUMMARY

The present invention relates to IR reflective pigment compositions and methods of their preparation and application.

BACKGROUND

Effect pigments, also known as gloss or lustrous pigments, are well known as pigments that produce unique coloristic effects. The optical properties of effect pigments are governed by reflection and/or interference phenomenon. In particular, finishes containing an effect pigment produce a "flop effect" whereby the coloristic characteristics of the finish change depending on the viewing angle. In general, when a change in viewing angle results in a change in lightness, the effect is referred to as "lightness flop", and when the change is in hue, the effect is referred to as "color flop".

Due to their unique color characteristics, the market for effect pigments is growing in such uses as cosmetics, inks, plastics and paints, and especially automotive paints. Weather fast effect pigments are currently employed in large quantities in the automotive paint industry.

IR reflective pigments are known in the market, and are used in the military, construction, inks, plastics and coatings industries. Their demand is on the rise.

IR reflective inorganic pigments such as C.I. Pigment Black 30, a spinel formulated primarily with nickel, manganese, chrome and iron, and C.I. Pigment Green 17, a chromium green black hematite, have been known for many years and have become popular. Although some of these pigments possess high IR reflectance, they have drawbacks like low color strength, abrasiveness, and toxicity issues.

The literature also describes IR reflective organic pigments. In particular certain perylenetetracarboxylic acid diimide pigments show favorable IR reflection behavior when used as a black pigment or shading component for military camouflage and other purposes. Such perylenetetracarboxylic acid diimide pigments are described in the German Patents DE 24 51 780 B1 and DE 301 159 C.

German Patent DE 296 298 C describes dark green camouflage pigment mixtures comprising perylenetetracarboxylic acid-bis-N,N'-2-aminoethyl imide and/or 5,5-dichloro indigo.

U.S. Pat. No. 5,540,998 relates to a solar heat shielding coating composition which consists mainly of two or more of organic pigments selected from red, orange, yellow, green, blue and purple pigments in such a manner as to yield a color of low lightness, particularly achromatic black, by additive mixture in a weather resistant vehicle and a structure covered with said coating composition. The heat shielding coating composition is capable of covering the outside of said structure exposed directly to the sun and suppressing a rise in the inside temperature. Such selected composition shows a certain IR reflection and can be used for solar heat shielding. The use of C.I. Pigment Violet 29, a perylenetetracarboxylic acid diimide as a pigment component for such an application is not mentioned.

European Patent Application No.23,318 describes a gray to black colored thermoplastic film for laminated identity cards, containing a white pigment and/or filler and a gray mixture of colored organic pigments. Preferred materials are (A) antimony oxide, kaolin, silica, chalk, barium sulfate, titanium dioxide and zinc sulfide; (B) mixtures of red and green pigments in 6–12:10 weight ratio; violet and green in 5–15:10 weight ratio; and violet, yellow and blue in 20:30:10 to 50:60:10 weight ratio.

Copending U.S. patent application No. 60/367,180, published as WO03/080741, describes a black co-milled pigment composition comprising a mixture of from 2 to 98 parts by weight of a green halogenated copper phthalocyanine pigment and from 2 to 98 parts by weight of at least one second organic pigment that is not a green halogenated copper phthalocyanine pigment, and which pigment composition has a specific surface area below 50 $m^2/g$. Such pigment compositions are different from those of the present invention. However, they have the disadvantage that a milling step is needed for their preparation. Additionally, they show different color shades when diluted with white, metallic or effect pigments.

The present invention relates to the surprising discovery that selected blends of a halogenated copper phthalocyanine with C.I. Pigment Violet 29, a perylenetetra-carboxylic acid diimide are black in masstone and can generate IR reflective colorations when applied in coatings, inks or plastics, and in particular, when applied together with effect pigments such as pearlescent mica.

BRIEF DESCRIPTION OF THE DRAWINGS

The IR reflective data are obtained utilizing a Varian Cary 500 IR spectrophotometer equipped with a reflectance Labsphere attachment.

FIG. 1 shows the IR reflection spectrum of inventive black pigment composition prepared according to Example 1, comprising 50 percent by weight of C.I. Pigment Green 7 and 50% percent by weight of C.I. Pigment Violet 29.

FIG. 2 IR shows the reflection spectrum of inventive pigment composition prepared according to Example 1 when applied in an automotive paint in a mixture with Russet mica (Afflair Pigment 9504 SW Red from the MEARL Corporation).

FIG. 3 IR shows the reflection spectrum of inventive black composition prepared according to Example 1 in an automotive paint in a mixture with White Mica.

FIG. 4 shows the IR reflection spectrum of the carbon black of example 4B.

FIG. 5 shows the IR reflection spectrum of carbon black of example 4B with Russet Mica.

FIG. 6 shows the IR reflection spectrum of carbon black of example 4B with White Mica.

DETAILED DESCRIPTION

The present invention relates to a pigment composition, which comprises from 20 to 80 parts by weight of a halogenated copper phthalocyanine of the formula I

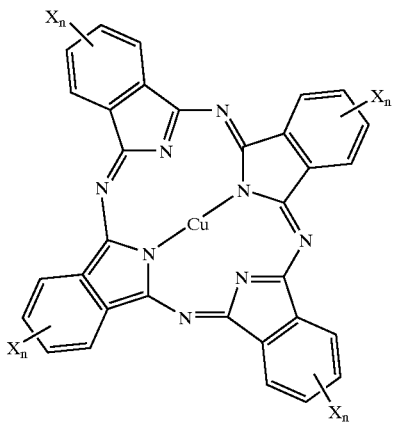

wherein X is chlorine and/or bromine and n is a number from 1 to 4, and 20 to 80 parts by weight of C.I. Pigment Violet 29, a perylenetetracarboxylic acid diimide of formula II

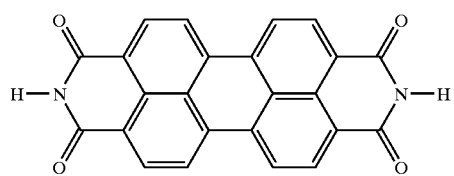

wherein the parts by weight of the halogenated copper phthalocyanine of formula (I) and the perylenetetracarboxylic acid diimide of formula (II) total 100 parts by weight, and which composition is characterized by an IR reflection spectrum with a positive slope in the wavelength range between 800 and 900 nm when incorporated as a coloring agent in coatings or plastics.

Preferably, the IR reflective pigment composition comprises from about 25 to 70 parts by weight of the halogenated copper phthalocyanine of formula (I) and about 30 to 75 parts by weight of the perylene-tetracarboxylic acid diimide of formula (II), most preferably from about 35 to 65 parts by weight of the C.I. Pigment Green 7 as the halogenated copper phthalocyanine of formula (I) and from about 35 to 65 parts by weight of the C.I. Pigment Violet 29 as the perylene-tetracarboxylic acid diimide of formula (I); in each instance the sum of the parts by weight of the corresponding pigment components is 100.

Preferably, the IR reflective pigment composition comprises green halogenated copper phthalocyanine pigments such as the chlorinated copper phthalocyanine, C.I. Pigment Green 7 and the brominated copper phthalocyanine, C.I. Pigment Green 36. It is most preferred that the IR reflective pigment composition comprises C.I. Pigment Green 7 as the halogenated copper phthalocyanine pigment of formula (I).

The inventive pigment compositions show outstanding pigment properties and are ideally suited for use as IR reflective compositions. Surprisingly, when incorporated into mixtures with effect pigments, such as pearlescent mica, the compositions are black with only a slightly bluish or reddish color flop, depending on the kind of pearlescent pigment, and show enhanced IR reflection. Therefore, besides their IR reflective properties, such compositions have unique color properties and due to their distinctive black color, offer new styling opportunities.

C.I. Pigment Violet 29 is a well known and commercially available perylenetetracarboxylic acid diimide pigment. Although a large or medium particle size perylenetetracarboxylic acid diimide pigment with a specific surface area in the range of 10 to 40 $m^2/g$ can be used for the inventive IR reflective pigment composition, preferably a small particle size pigment with a specific surface area equal to or greater than about 40 $m^2/g$, most preferably equal to or greater than about 50 $m^2/g$ is used as a component for the inventive pigment composition.

Thus, the present invention relates to a process for the preparation of new pigment compositions which offer the possibility of creating new color shades when applied alone or in mixture with other organic, inorganic or effect pigments, and which have the additional advantage of being IR reflective.

In order to measure the reflection spectrum, the inventive pigment is first incorporated into a substrate such as the basecoat/clearcoat paint system described in Example 4A. The reflection spectrum of the pigmented substrate such as the coated panel or a pigmented plastic sheet, is then measured. The reflection spectra are measured at "complete hide", which means that the substrate is pigmented to such an extent that no background color is observable. At "complete hide" it is not possible to see the background color of a coated panel or the background color through a pigmented plastic sheet.

The overall shape of the reflection spectra is characteristic of the inventive pigment regardless of the substrate into which the pigment is incorporated. However, the percent reflectance at any particular wavelength will vary depending on the substrate.

Appropriate substrates include lacquers, inks, coating compositions, and plastics. Especially appropriate coating compositions include the basecoat/clearcoat systems conventionally used in the automotive industry. Especially appropriate plastics include the polyvinyl halides, especially polyvinyl chloride, and polyolefins, for example low or linear low density or high density polyethylene and polypropylene.

A masstone reflectance spectrum is the reflectance spectrum observed when the inventive pigment is the only pigment used to color the substrate.

Basecoat/clearcoat coating systems, such as those used in the automotive industry, are important substrates for the inventive pigment composition. When incorporated into a basecoat/clearcoat paint system at complete hide in a masstone color shade, the halogenated copper phthalocyanine, C.I. Pigment Green 7 shows a small reflection peak in the visible range at 500 nm and IR reflection starting with a positive slope at 800 nm reaching around 15 to 18% in the wavelength range of 950 to 2500 nm. The masstone base coat clear coat panel of C.I. Pigment Violet 29 shows a reflection of only 4 to 5% in the wavelength range of 400 to 600 nm, starting with a positive slope at 630 nm, reaching a reflection of only 11.5% at 1000 nm. Surprisingly, the inventive black pigment composition prepared according to present Example 1, comprising 50 percent by weight of C.I. Pigment Green 7 and 50% percent by weight of C.I. Pigment Violet 29 shows no reflection peak at 500 nm, a reflection of only 5 to 6% in the visible range from 400 to 650 nm, following by a positive slope between 800 to 900 nm and reaching a maximum of around 20% reflection at 950–1000 nm (see FIG. 1).

Unexpectedly, the inventive compositions display a strong IR reflection in the range of 700 to 2000 nm when incorporated with commercially available pearlescent mica pigments as described more explicitly in the following patent examples. For example the inventive pigment composition prepared according to Example 1 shows a strong IR reflection of above 50% in the wavelength range of 1000 to 1400 nm when applied in an automotive paint in a 1:1 mixture with Russet mica (Afflair Pigment 9504 SW Red from the MEARL Corporation, see FIG. 2).

In comparison to other known IR reflective pigments, like inorganic C.I. Pigment Black 15 or C.I. Pigment Green 17, the inventive pigment composition mixtures with pearlescent mica show a favorable reflection spectrum with a steeper positive slope in the wavelength range of 700 to 1000 nm.

Additionally, the inventive pigment composition show a black let down color when incorporated with pearlescent micas. The darkness of this coloration is comparable to carbon black let down with the corresponding mica pigments. However, such carbon black/pearlescent mica mixtures show as little IR reflection in the range of 700 to 2500 nm as carbon black itself (see FIGS. 4 to 6).

By simply co-blending a green halogenated copper phthalocyanine with C.I. Pigment Violet 29, the inventive IR reflective pigment compositions are prepared. Thus, no expensive and time consuming kneading or milling process is needed. However, the inventive IR reflective pigment compositions can also be prepared by a dry or wet milling process in the presence of additives. It is preferred that the inventive IR reflective black pigment composition is preparted by co-blending, optionally in the presence of additives, by a dry or wet milling process. It is even more preferred that the inventive IR reflective black pigment composition is prepared by co-blending by a dry blending process. As illustrated in the accompanying examples, a masstone formulation generally produces a strong black coating. Such black pigments are ideal adjunct-effect pigments when applied with effect pigments and therefore beneficial for shading applications.

The preparation of the green halogenated copper phthalocyanines, for example C.I. Pigment Green 7, the chlorinated copper phthalocyanine, is well known in the industry and several pigment producers market it. A particular interesting form for the current invention is IRGALITE Green 2180, from Ciba Specialty Chemicals, a small particle size C.I. Pigment Green 7 with an average pigment particle size of below 0.2 $\mu$m as measured by an electron micrograph.

The inventive pigment mixtures are prepared by mixing aqueous slurries of the corresponding pigment components in their desired ratio. Preferably they are co-blended in their dry powder forms, optionally in the presence of additives, in any suitable equipment such as a closed container, which is rolled on a roller gear or shaken on a shaker. Suitable blenders are also the TURBULA mixer from W. Bachofen, Basel, Switzerland, or the P-K TWIN-SHELL INTENSIFIER BLENDER from Patterson-Kelley Division, East Stroudsburg, Pa., or other vertical or horizontal commercially available blenders.

Thus, the inventive pigment compositions can be prepared in an environmentally friendly, economical process in available equipment and with a high throughput.

Preferably, the method for preparing an inventive IR reflective black pigment composition comprises co-blending dry pigment powders of the halogenated copper phthalocyanine and the perylene tetracarboxylic acid diimide, optionally in the presence of additives, in a horizontal or vertical blender.

In order to further improve the properties of the inventive pigment composition, the mixture is co-blended in the presence of an additive selected from the group consisting of texture-improving agents, anti-flocculating agents, rheology improving agents or extenders and mixtures thereof. The additive or additives are optionally added before, during or after the blending process.

The texture-improving agent, anti-flocculant, rheology improving agent and/or extender is preferably incorporated into the present pigment compositions in an amount of from 0.05 to 30 percent, most preferably 0.5 to 25 percent, by weight, based on the combined weights of the pigment mixture.

Texture-improving agents are especially useful as an additional component, which improves the properties of the black pigment composition. Suitable texture-improving agents include fatty acids having at least 12 carbon atoms, and amides, esters or salts of fatty acids. Typical fatty acid derived texture-improving agents include fatty acids such as stearic acid or behenic acid, and fatty amines like lauryl amine, or stearylamine. In addition, fatty alcohols or ethoxylated fatty alcohols, diols like aliphatic 1,2-diols such as 1,2-dodecanediol or polyols like polyvinylalcohol and epoxidized soy bean oil, waxes, resin acids and resin acid salts are suitable texture-improving agents. Rosin acids and rosin acid salts are especially suitable texture-improving agents.

Anti-flocculating agents, which can also act as rheology improving agents, for example copper phthalocyanine derivative, quinacridone- or dihydroquinacridone derivatives, are known in the pigment industry. Preferably, the additive is quinacridone monosulfonic acid or quinacridone monosulfonic acid aluminum salt or 3,5-dimethylpyrazol-1-methyl quinacridone or a mixture thereof.

Generally, the inventive IR reflective pigment composition is characterized as having a chroma C* as measured by C.I.E. color space values in masstone of less than 3, preferably less than 2.5 as measured on a panel coated with an acrylic or polyester enamel coating of dry film thickness of 35±10 $\mu$m and a pigment to binder weight ratio of 0.5.

Typically, the pigments in the inventive black IR reflective pigment composition have a particle size of below 10 microns, most preferably in the range of 0.001 to 3 microns, and most preferably 0.002 to 0.2 microns.

Unexpectedly, the inventive pigment mixtures show characteristic absorption and reflection in the visible and IR wavelength range and unique color characteristics when incorporated into high molecular weight substrates.

The inventive pigment compositions of this invention are suitable for use as pigments for coloring a solid or liquid substrate, preferably a high molecular weight organic material.

Examples of high molecular weight organic materials which may be colored or pigmented with the inventive black pigment compositions are cellulose ethers and esters such as ethyl cellulose, nitrocellulose, cellulose acetate, cellulose butyrate, natural resins or synthetic resins such as polymerization resins or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyesters, rubber, casein, silicone and silicone resins, singly or in mixtures. Preferably, the high molecular weight materials have a molecular weight in the range of from $10^3$ to $10^8$ g/mol.

Preferably, the high molecular weight organic material is an industrial or automotive paint, an ink, a security ink, a powder or a UV/EB cured coating system.

The above high molecular weight organic materials may be singly or as mixtures in the form of plastics, melts or of spinning solutions, varnishes, paints or printing inks. The inventive pigment compositions are preferably employed in an amount of 0.1 to 30 percent by weight, based on the high molecular organic material to be pigmented.

The pigmenting of the high molecular weight organic materials with the black pigment compositions of the invention is carried out for example by incorporating such a composition, optionally in the form of a masterbatch, into the substrates using roll mills, mixing or grinding machines. The pigmented material is then brought into the desired final form by methods which are known per se, for example calendering, molding, extruding, coating, spinning, casting or by injection molding. It is often desirable to incorporate plasticizers into the high molecular weight compounds before processing in order to produce non-brittle moldings or to diminish their brittleness. Suitable plasticizers are for example esters of phosphoric acid, phthalic acid or sebacic acid. The plasticizers may be incorporated before or after working the composition into the polymers.

The inventive pigment compositions are suitable as colorants in powders and powder coating materials, especially in triboelectrically or electrokinetically sprayable powder coating materials which are used to coat the surfaces of articles made, for example, from metal, wood, plastic, glass, ceramic, concrete, textile material, paper or rubber. As powder coating resins it is typical to use epoxy resins, carboxyl- and hydroxyl-containing polyester resins, polyurethane resins and acrylic resins together with customary hardeners. Resin combinations are also used. For example, epoxy resins are frequently used in combination with carboxyl- and hydroxyl-containing polyester resins. Examples of typical hardener components (depending on the resin system) are acid anhydrides, imidazoles and also dicyandiamide and its derivatives, blocked isocyanates, bisacylurethanes, phenolic resins and melamine resins, triglycidyl isocyanurates, oxazolines and dicarboxylic acids.

Furthermore, the inventive pigment compositions are suitable as colorants in inkjet inks on an aqueous and nonaqueous basis and also in those inks that operate in accordance with the hot-melt process.

Such printing inks are, for example, a liquid or paste-form dispersion that comprises pigments, binders and also optionally solvents and/or optionally water and additives. In a liquid printing ink, the binder and, if applicable, the additives are generally dissolved in a solvent. Customary viscosities in the Brookfield viscometer are, for example, from 20 to 5000 mPa.s, for example from 20 to 1000 mPa.s, for liquid printing inks. For paste-form printing inks, the values range, for example, from 1 to 100 Pa.s, preferably from 5 to 50 Pa·s. The person skilled in the art will be familiar with the ingredients and compositions of printing inks.

Suitable pigments, like the printing ink formulations customary in the art, are generally known and widely described.

Printing inks comprise pigments advantageously in a concentration of, for example, from 0.01 to 40% by weight, preferably from 1 to 25% by weight, especially from 5 to 10% by weight, based on the total weight of the printing ink.

The printing inks can be used, for example, for intaglio printing, flexographic printing, screen printing, offset printing, lithography or continuous or dropwise ink-jet printing on material pretreated in accordance with the process of the invention using generally known formulations, for example in publishing, packaging or shipping, in logistics, in advertising, in security printing or in the field of office equipment.

Suitable printing inks are both solvent-based printing inks and water-based printing inks. Of interest are, for example, printing inks based on aqueous acrylate. Such inks are to be understood as including polymers or copolymers that are obtained by polymerisation of at least one monomer containing a group

and that are dissolved in water or a water-containing organic solvent.

Suitable organic solvents are water-miscible solvents customarily used by the person skilled in the art, for example alcohols, such as methanol, ethanol and isomers of propanol, for example isopropanol, butanol and pentanol, ethylene glycol and ethers thereof, such as ethylene glycol methyl ether and ethylene glycol ethyl ether, and ketones, such as acetone, ethyl methyl ketone or cyclohexanone. Water and alcohols are preferred.

Suitable printing inks comprise, for example, as binder primarily an acrylate polymer or copolymer and the solvent is selected, for example, from the group consisting of water, $C_1$-$C_5$alcohols, ethylene glycol, 2-($C_1$-$C_5$alkoxy)-ethanol, acetone, ethyl methyl ketone and any mixtures thereof.

In addition to the binder, the printing inks may also comprise customary additives known to the person skilled in the art in customary concentrations.

For intaglio or flexographic printing, a printing ink is usually prepared by dilution of a printing ink concentrate and can then be used in accordance with methods known per se. The printing inks may, for example, also comprise alkyd systems that dry oxidatively.

The printing inks are dried in a known manner customary in the art, optionally with heating of the coating.

A suitable aqueous printing ink composition comprises, for example, a pigment or a combination of pigments, a dispersant and a binder.

Dispersants that come into consideration include, for example, customary dispersants, such as water-soluble dispersants based on one or more arylsulfonic acid/formaldehyde condensation products or on one or more water-soluble oxalkylated phenols, non-ionic dispersants or polymeric acids.

The arylsulfonic acid/formaldehyde condensation products are obtainable, for example, by sulfonation of aromatic compounds, such as naphthalene itself or naphthalene-containing mixtures, and subsequent condensation of the resulting arylsulfonic acids with formaldehyde. Such dispersants are known and are described, for example, in U.S. Pat. No. 5,186,846 und DE-A-19727767. Suitable oxalkylated phenols are likewise known and are described, for example, in U.S. Pat. No. 4,218,218 und DE-A-19727767. Suitable non-ionic dispersants are, for example, alkylene oxide adducts, polymerisation products of vinylpyrrolidone, vinyl acetate or vinyl alcohol and co- or ter-polymers of vinyl pyrrolidone with vinyl acetate and/or vinyl alcohol.

It is also possible, for example, to use polymeric acids which act both as dispersants and as binders. Examples of suitable binder components that may be mentioned include acrylate-group-containing, vinyl-group-containing and/or epoxy-group-containing monomers, prepolymers and polymers and mixtures thereof. Further examples are melamine acrylates and silicone acrylates. The acrylate compounds may also be non-ionically modified (e.g. provided with amino groups) or ionically modified (e.g. provided with acid groups or ammonium groups) and used in the form of aqueous dispersions or emulsions (e.g. EP-A-704 469, EP-A-12 339). Furthermore, in order to obtain the desired viscosity, the solventless acrylate polymers can be mixed with so-called reactive diluents, for example vinyl-group-containing monomers. Further suitable binder components are epoxy-group-containing compounds.

The printing ink compositions may also comprise as additional component, for example, an agent having a water-retaining action (humectant), e.g. polyhydric alcohols, polyalkylene glycols, which renders the compositions especially suitable for ink-jet printing.

It will be understood that the printing inks may comprise further auxiliaries, such as are customary especially for (aqueous) ink-jet inks and in the printing and coating industries, for example preservatives (such as glutardialdehyde and/or tetramethylolacetyleneurea, anti-oxidants, degassers/defoamers, viscosity regulators, flow improvers, anti-settling agents, gloss improvers, lubricants, adhesion promoters, anti-skin agents, matting agents, emulsifiers, stabilisers, hydrophobic agents, light stabilisers, handle improvers and anti-statics. When such agents are present in the compositions, their total amount is generally $\leq 1\%$ by weight, based on the weight of the preparation.

It is also possible for the printing inks to comprise buffer substances, for example borax, borate, phosphate, polyphosphate or citrate, in amounts of e.g. from 0.1 to 3% by weight, in order to establish a pH value of e.g. from 4 to 9, especially from 5 to 8.5.

As further additives, such printing inks may comprise surfactants or humectants. Surfactants that come into consideration include commercially available anionic and non-ionic surfactants. Humectants that come into consideration include, for example, urea or a mixture of sodium lactate (advantageously in the form of a 50 to 60% aqueous solution) and glycerol and/or propylene glycol in amounts of e.g. from 0.1 to 30% by weight, especially from 2 to 30% by weight, in the printing inks.

Furthermore, the printing inks may also comprise customary additives, for example foam-reducing agents or especially substances that inhibit the growth of fungi and/or bacteria. Such additives are usually used in amounts of from 0.01 to 1% by weight, based on the total weight of the printing ink.

The printing inks may also be prepared in a customary manner by mixing the individual components together, for example in the desired amount of water.

As already mentioned, depending upon the nature of the use, it may be necessary for e.g. the viscosity or other physical properties of the printing ink, especially those properties which influence the affinity of the printing ink for the substrate in question, to be adapted accordingly.

The printing inks are also suitable, for example, for use in recording systems of the kind in which a printing ink is expressed from a small opening in the form of droplets which are directed towards a substrate on which an image is formed. Suitable substrates are, for example, textile fibre materials, paper, plastics or aluminium foils pretreated by the process according to the invention. Suitable recording systems are e.g. commercially available ink-jet printers.

Preference is given to printing processes in which aqueous printing inks are used.

The inventive pigment compositions are also suitable as colorants for color filters, both for additive and for subtractive color generation.

The inventive pigment compositions are distinguished by outstanding coloristic and Theological properties, high color strength, ease of dispersibility, high thermostability, e.g. in plastic applications, and high transparency, e.g. in paint and ink applications.

To obtain different shades, it is also possible to add inorganic or polymeric fillers or other chromophoric components such as organic or inorganic pigments like white, colored, effect, fluorescent or phosphorescent pigments, in any amount, to the high molecular weight organic compounds, in addition to the pigment compositions of this invention.

Especially suitable classes of effect pigments which can be advantageously used in combination with the inventive pigment compositions are selected from the group of metallic pigments like aluminum, gold, brass or copper pigments, including metal oxide coated metal pigments such as iron oxide coated aluminum as described in published European Patent 33457, platelike graphite or molybdenum disulfide pigments such as those described in U.S. Pat. Nos. 4,517,320; 5,034,430; large particle size organic pigments such as those described in U.S. Pat. Nos. 5,084,573; 5,095,122; 5,298,076 and 5,347,014; the well known coated flaky mica, synthetic aluminum oxide or silicon dioxide pigments, wherein the coating can be single or multi layered and consists of colorless, chromatic or black microcrystalline compounds such as $TiO_2$, $SnO_2$, $ZrO_2$, $FeOOH$, $Fe_2O_3$, $Cr_2O_3$, $CrPO_4$, $KFe[Fe_9CN)_6$, $TiO_{2-x}$, $Fe_3O_4$, $FeTiO_3$ $TiN$ and $TiO$, and the more recent classes of effect pigments, for example, the multilayer interference platelets disclosed in PCT International Applications WO 95-17,480 and WO.95-29,140, or the liquid crystal interference pigments described for example in German patent 4,418,075.

Such effect pigments can be incorporated in mixture with the inventive pigment composition when incorporated into a substrate or can be co-blended as powder before, during or after the preparation of the inventive pigment compositions.

For example, the inventive black pigment can be combined with an effect pigment. The weight of the IR reflective black pigment in the resulting pigment mixture is between about 90 to 10 percent, preferably between about 80 to 20 percent and most preferably between about 75 to 25 percent based on the total weight of the mixture.

In the case where pearlescent mica is combined with the inventive black pigment, the pearlescent mica/inventive black pigment mixture shows a very high IR reflection.

Although the new inventive pigment compositions show good light and heat stability, it can be advantageous to apply the present compositions in the presence of commonly known and commercially available antioxidants, UV absorbers, light stabilizers, processing agents and so forth.

For pigmenting coatings, varnishes and printing inks, the high molecular weight organic materials and the inventive pigmentary compositions, together with optional additives such as fillers, other pigments, siccatives, light- or UV-stabilizers, are finely dispersed in a common organic solvent or mixture of solvents including water. The procedure may be such that the individual components by themselves, or several jointly, are dispersed or dissolved in the solvent and subsequently all the components are mixed.

The inventive black IR reflective pigment compositions, in comparison to carbon black, have considerably better rheological properties, and are particularly suitable for preparing aqueous and solvent based coatings conventionally employed in the automobile industry, especially in acrylic/melamine resin, alkyd/melamine resin or thermoplastic acrylic resin systems, as well as in powder coatings and UV/EB cured coating systems.

An inventive pigment composition with especially good rheological properties is obtained when the corresponding pigment components are co-blended with additives wherein the additive is quinacridone monosulfonic acid or quinacridone monosulfonic acid aluminum salt or 3,5-dimethyl pyrazol-1-methyl quinacridone, or mixtures thereof. Such co-blended pigment mixtures can show excellent rheological properties when applied in automotive and industrial paints.

Coatings and ink systems colored with the inventive pigment compositions possess a high gloss, excellent heat, light and weather fastness, as well as bleed and over spraying fastness properties.

Due to their outstanding heat stability and nonabrasiveness, the inventive pigment compositions are particularly appropriate for coloring thermoplastics including polypropylene, polyethylene, soft, medium hard and hard polyvinyl chloride, ABS, PES and nylon. For example in soft and medium hard polyvinyl chloride, very attractive black, migration resistant colorations can be prepared.

The colorations obtained in plastics and filaments show unique reflection spectra and, have good all-round fastness properties such as high migration resistance, heat and light stability and weathering behavior.

Generally, the inventive black pigment compositions, when applied at a pigment concentration of 0.5 percent in high-density polyethylene and molded at 200° C., show a reflection of 4 to 7 percent, preferably 4 to 6 percent in the region of 400 to 700 nm.

The black pigment compositions of this invention are also suitable for use as colorants for paper, including security paper, leather, inorganic materials, seeds, and in cosmetics.

The following examples illustrate various embodiments of the invention, but the scope of the invention is not limited thereto. In the examples, all parts are by weight unless otherwise indicated. The coloristic data are obtained utilizing a CS-5 CHROMA SENSOR spectrophotometer. The IR reflective data are obtained utilizing a Varian Cary 500 IR spectrophotometer equipped with a reflectance Labsphere attachment.

The color measurements were carried out in a large area view with a spectral component included using a ACS Colorimeter Program on an ACS, CS-5 Chromasensor from Applied Color Systems, Inc. and distributed by DATA COLOR International.

EXAMPLES

Example 1

A flask is charged with 20 g Perrindo Violet V-4050, a C.I. Pigment Violet 29 from BAYER and 20 g IRGAZIIN Green 2180, a C.I.Pigment Green 7 from CIBA Specialty Chemicals. The flask is closed tight and its contents are mixed for 2 hours by rolling the flask on a rolling gear at a rotation speed of 115 feet/minute, yielding a greenish black powder.

By rubout according to ASTM method D-387-60 in a lithographic varnish, the pigmentary composition shows a strong black masstone color.

Example 2

The procedure of Example 1 is repeated, using instead of 20 g Perrindo Violet V-4050, 20 g IRGAZIN Violet 9029, a C.I. Pigment Violet 29 from CIBA Specialty Chemicals, yielding a greenish black powder and a strong black masstone color when rubbed out according to ASTM method D-387-60.

Example 3

The procedure of Example 2 is repeated, using instead of 20 g, 30 g IRGAZIN Violet 9029, yielding a greenish black powder, which shows a strong black masstone color when rubbed out according to ASTM method D-387-60.

Example 4A

This example shows the incorporation of the inventive pigment black into an automotive solvent-based paint system.

Mill Base Formulation

A pint jar is charged with 40.5 grams high solids acrylic copolymer resin (68% solids) from DUPONT, 8.84 grams acrylic A-B dispersant resin consisting of (55% solids) from DUPONT, and 69.46 grams Solvesso 100, primarily a mixture of aromatic solvents from American Chemical. 16.2 grams black pigment composition of Example 1 and 240 grams of glass beads are added. The mixture in the jar is shaken on a Skandex shaker (manufactured by IDEX Corp.) for 1 hour. The black "mill base" contains 12.0% pigment with a pigment/binder ratio of 0.5 and a solids content of 30%.

Masstone Color for Spraying a Panel 70.9 grams of the above millbase, 40.8 grams of a polyester acrylic urethane based solution 47.8% solids, 18.3 grams of a melamine resin based solution (both solutions are from DU PONT) are mixed and diluted with a solvent mixture comprising 76 parts xylene, 21 parts butanol and 3 parts methanol to a spray viscosity of 20–22 seconds as measured by a #2 Fisher Cup.

The resin/pigment dispersion is sprayed onto a panel twice at 1½-minute intervals as basecoat. After 2 minutes, the clearcoat resin is sprayed twice at 1½-minute intervals onto the basecoat. The sprayed panel is then flashed with air in a flash cabinet for 10 minutes and then "baked" in an oven at 265° F. (120 ° C.) for 30 minutes, yielding a black colored panel.

Russet Mica Dispersion

The following ingredients are stirred together to provide a mica dispersion containing 27.9% pearlescent mica pigment and a total solid content of 69.1% solids:

154.8 grams of bright russet Mica, EXTERIOR MEARLIN SUPER RUSSET 459Z from The Mearl Corp.,
295 grams of non-aqueous dispersion resin, and
104.4 grams of acrylo urethane resin.

Russet Mica Color for Spraying Paint

A 50/50 russet mica shade coating (for 25% pigment loading) is prepared by mixing the following ingredients:
43.2 grams of the black "mill base" dispersion
15.4 grams of "russet mica dispersion"
45.4 grams of a polyester acrylic urethane based solution
16.1 grams of a melamine based solution The black pigment/pearlescent mica/resin dispersion, which has excellent rheological properties, is sprayed onto a primed panel 8 times (for complete hiding) at 1-minute intervals as basecoat. After 3 minutes, clear coat resin is sprayed twice at 1-minute intervals onto the basecoat. The sprayed panel is flashed with air in a flash cabinet for 10 minutes and then "baked" in an oven at 265° F. (130° C.) A black colored effect coating with excellent weatherability is obtained. The coating shows high gloss and a black color.

White Mica Dispersion

The following ingredients are stirred together to provide a mica dispersion containing 27.9% pearlescent mica pigment and a total solid content of 69.1% solids:
154.8 grams of bright russet mica, EXTERIOR MEARLIN BRIGHT WHITE 139X from The Mearl Corp.,
295 grams of non-aqueous dispersion resin, and
104.4 grams of acrylo urethane resin.

White Mica Color for Spraying Paint

A 50/50 russet mica shade coating (for 25% pigment loading) is prepared by mixing the following ingredients:
43.2 grams of the black "mill base" dispersion
15.4 grams of "White mica dispersion"
45.4 grams of a polyester acrylic urethane based solution
16.1 grams of a melamine based solution The black pigment/pearlescent mica/resin dispersion, which has excellent rheological properties, is sprayed onto a primed panel 8 times (for complete hiding) at 1-minute intervals as basecoat. After 3 minutes, clear coat resin is sprayed twice at 1-minute intervals onto the basecoat. The sprayed panel is flashed with air in a flash cabinet for 10 minutes and then "baked" in an oven at 265° F. (130° C.). A black colored effect coating with excellent weatherability is obtained. The coating shows high gloss and a black color with a bluish hue.

Example 4B

Example 4B is a comparative Example. The procedures of the preparation of a masstone, a russet mica and white mica panel are repeated using instead of 16.2 grams black pigment composition of Example 1, 16.2 grams Color Black FW 200, a C.I. Pigment Black 7 from DEGUSSA yielding a black masstone, a black russet mica and a black white mica coated panel.

Color Measurement

The following color characteristic data are measured on the coated panels, demonstrating the surprising black low chroma masstone and let down colors with the pearlescent mica by using the inventive pigment mixture.

C.I.E. L*, C*, h color space value numbers using a D65 illuminant and 10 degree observer with a specular component included:

| Coated panel | L* | C* | h |
|---|---|---|---|
| MASSTONE COLOR | | | |
| Inventive Black according to Example 4A | 26.3 | 1.5 | 305 |
| Carbon Black according to Example 4B | 25.8 | 0.8 | 261.9 |
| RUSSET MICA COLOR | | | |
| Inventive Black according to Example 4A | 28.9 | 2.7 | 359.6 |

| Coated panel | L* | C* | h |
|---|---|---|---|
| Carbon Black according to Example 4B | 27.9 | 3.8 | 326.8 |
| WHITE MICA COLOR | | | |
| Inventive Black according to Example 4A | 28.7 | 3.5 | 287.7 |
| Carbon Black according to Example 4B | 29.0 | 0.2 | 93.4 |

The above readings of the inventive IR reflective black pigment show a low lightness and low chroma in the range of carbon black.

IR Reflective Measurements

The panels prepared as described in the Examples 4A and 4B were measured on a Varian Cary 500 IR spectrophotometer manufactured by Varian equipped with a reflectance Labsphere attachment. The reflection spectra are displayed in FIG. 1 to FIG. 6. They show IR reflection in the wavelength range of 700 to 2500 nm for the coatings containing the inventive samples (FIG. 1 masstone, FIG. 2 inventive black in conjunction with Russet Mica and FIG. 3 in conjunction with White Mica) but very little IR reflection for carbon black and the corresponding pearlescent mica let downs (FIG. 4 masstone, FIG. 5 carbon Black/Russet Mica, FIG. 6 carbon black/White Mica).

Example 5

63.0 grams of polyvinyl chloride, 3.0 grams epoxidized soy bean oil, PARAPLEX G-62 from the C.P. Hall Company, 2.0 grams of barium/cadmium heat stabilizer, 32.0 grams dioctyl phthalate and 1.0 gram of the black pigment composition prepared according to Example 2 are mixed together in a glass beaker using a stirring rod. The mixture is formed into a soft PVC sheet with a thickness of about 0.4 mm by rolling for 8 minutes on a two roll laboratory mill at a temperature of 160° C, a roller speed of 25 rpm and friction of 1:1.2, by constant folding, removal and feeding. The resulting soft PVC sheet is colored in an attractive black shade and has excellent fastness to heat, light and migration.

Example 6

Five grams of the black pigment composition prepared according to Example 3, 2.65 grams CHIMASORB 944LD (hindered amine light stabilizer), 1.0 gram TINUVIN 328 (hydroxylphenyl benzotriazole UV absorber) and 2.0 grams IRGANOX B-215 Blend (blend of phosphite and hindered phenolic anti-oxidants), all available from Ciba Specialty Chemicals, are mixed together with 1000 grams of high density polyethylene at a speed of 175–200 rpm for 30 seconds after flux. The fluxed, pigmented resin is chopped up while warm and malleable, and then fed through a granulator. The resulting granules are molded on an injection molder with a 5 minute dwell time and a 30 second cycle time at a temperature of 200, 250 and 300° C. Homogeneously colored chips, which show a black color with practically no color differences, are obtained. They have excellent light stability.

Example 7

Five grams of the black pigment composition prepared according to Example 2 is incorporated in 100 grams of a vinyl-resin ink lacquer system by stirring the powder in the system for 30 minutes. The resulting black ink is diluted to a pigment concentration of 1% with 1-methoxy-2-propanol.

When the lacquer is bubble free, (after ca.1 5 minutes)—the full shade ink applications are drawn with the KCC-automatic film applicator (speed=5) on a polyethylene foil. Using a 100 µm bar coater.

After allowing 15 minutes to flash off at room temperature, the draw downs are dried in the oven for 30 minutes at 40° C.

After drying the lacquer film is carefully taken off and the spectrum is recorded with the Lamda 900 spectrometer from 1100 nm to 200 nm. The clear coat lacquer film is the base line.

The reflection spectrum shows a reflection of below 20% between 230 to 700 nm, a positive slope between 700 and 900 nm, reaching a reflection of above 95% at 1000 nm.

I claim:

1. An IR reflective black pigment composition comprising 20 to 80 parts by weight of a halogenated copper phthalocyanine of the formula I

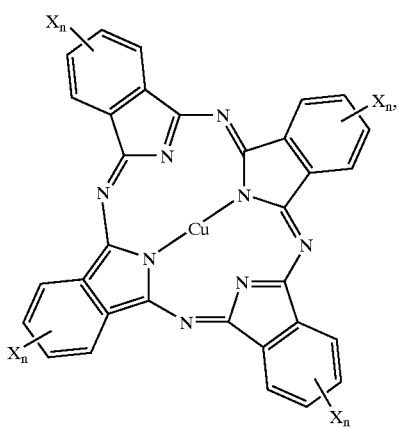

wherein X is chlorine and/or bromine and n is a number from 1 to 4,
and 20 to 80 parts by weight of a perylenetetracarboxylic acid diimide of formula II

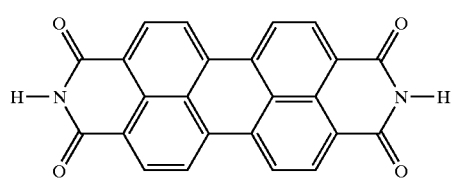

wherein the parts by weight of the halogenated copper phthalocyanine of formula I and the perylenetetracarboxylic acid diimide of formula II total 100 parts by weight, and which composition is characterized by an IR reflection spectrum with a positive slope in the wavelength range between 800 and 900 nm when incorporated as coloring agent in coatings or plastics.

2. An IR reflective black pigment composition according to claim 1, in which the halogenated copper phthalocyanine is C.I. Pigment Green 7 or C.I. Pigment Green 36 or a mixture thereof.

3. An IR reflective black pigment composition according to claim 1, in which the halogenated copper phthalocyanine is C.I. Pigment Green 7.

4. An IR reflective black pigment composition according to claim 1, comprising from 25 to 70 parts by weight of the halogenated copper phthalocyanine of formula I and from 30 to 75 parts by weight of the perylenetetracarboxylic acid diimide of formula II.

5. An IR reflective black pigment composition according to claim 4, comprising from 35 to 65 parts by weight of the halogenated copper phthalocyanine of formula I and from 35 to 65 parts by weight of the perylenetetracarboxylic acid diimide of formula II, wherein the halogenated copper phthalocyanine is C.I. Pigment Green 7 and the perylenetetracarboxylic acid diimde is C.I. Pigment Violet 29.

6. An IR reflective black pigment composition according to claim 1, wherein the perylenetetracarboxylic acid diimide has a specific surface area in the range of 10 to 40 $m^2/g$.

7. An IR reflective black pigment composition according to claim 1, wherein the perylenetetracarboxylic acid diimide is C.I. Pigment Violet 29 and has a specific surface area in the range of equal to or greater than about 40 $m^2/g$.

8. An IR reflective black pigment composition according to claim 7, wherein the C.I. Pigment Violet 29 has a specific surface area in the range of equal to or greater than about 50 $m^2/g$.

9. An IR reflective black pigment composition according to claim 3, wherein the C.I. Pigment Green 7 has an average particle size of less than 0.2 µm as measured by an electron micrograph.

10. An IR reflective black pigment composition according to claim 1, wherein the composition is co-blended, optionally in the presence of an additive or additives by a dry or wet milling process.

11. An IR reflective black pigment composition according to claim 1, wherein the composition is co-blended by a dry blending process.

12. An IR reflective black pigment composition according to claim 10, wherein the mixture is co-blended in the presence of an additive selected from the group consisting of texture improving agents, anti-flocculating agents, extenders and mixtures thereof.

13. An IR reflective black pigment composition according to claim 10, wherein the additive or additives are added in an amount of 0.5 to 25% by weight based on the pigment mixture.

14. An IR reflective black pigment composition according to claim 12, wherein the texture improving agent is selected from the group consisting of fatty amines or fatty acids having at least 12 carbon atoms, amides, esters or salts of fatty acids and mixtures thereof, fatty alcohols or ethoxylated fatty alcohols, diols, polyols, epoxidized soy bean oil, waxes, resin acids and resin acid salts.

15. An IR reflective black pigment composition according to claim 12, wherein the anti-flocculating agent is a copper phthalocyanine derivative, a quinacridone or a dihydroquinacridone derivative.

16. An IR reflective black pigment composition according to claim 10, wherein the additive is quinacridone monosulfonic acid or quinacridone monosulfonic acid aluminum salt or 3,5-dimethylpyrazol-1-methyl quinacridone, or a mixture thereof.

17. An IR reflective black pigment composition according to claim 1, wherein the IR reflective black pigment composition is further combined with an effect pigment to produce a mixture, wherein the IR reflective black pigment is between about 90 to 10 weight % of the total weight of the mixture.

18. A method for preparing an IR reflective black pigment composition according to claim 1, which comprises co-blending dry pigment powders of the halogenated copper phthalocyanine and the perylenetetracarboxylic acid diImide, optionally in the presence of additives, in a horizontal or vertical blender.

19. A method for coloring a solid or liquid substrate comprising incorporating an effective pigmenting amount of an IR reflective black pigment composition as defined in claim 1 into said substrate.

20. A method according to claim 19, wherein the substrate is a high molecular weight organic material having a molecular weight in the range of from $10^3$ to $10^8$ g/mol.

21. A method according to claim 20, wherein the high molecular weight organic material is selected from the group consisting of cellulose ethers and esters, natural resins or synthetic resins, alkyd resins, phenolic plastics, polycarbonates, polyolefins, polystyrene, polyvinyl chloride, polyamides, polyurethanes, polyesters, rubber, casein, silicone and silicone resins, singly or in mixtures.

22. A method according to claim 20, wherein the high molecular weight organic material is an industrial or automotive paint, an ink, a security ink, a powder or a UV/EB cured coating system.

23. A method of claim 19, wherein the substrate is paper, leather, a solid or liquid polymeric material, mineral oil, an inorganic substance, a cosmetic material or a seed.

24. A method for coloring a substrate comprising applying a coating composition that contains an effective pigmenting amount of an IR reflective black pigment composition as defined in claim 1 to said substrate.

25. A method as defined in claim 24 wherein the IR reflective black pigment composition further comprises an inorganic or organic effect pigment.

26. A method for coloring a substrate according to claim 25 in which said effect pigment is a pearlescent mica pigment.

* * * * *